(12) United States Patent
Ihara

(10) Patent No.: US 7,302,169 B2
(45) Date of Patent: Nov. 27, 2007

(54) METHOD AND APPARATUS FOR PLAYING-BACK MOVING IMAGE DATA

(75) Inventor: Noriyuki Ihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 811 days.

(21) Appl. No.: 10/747,082

(22) Filed: Dec. 30, 2003

(65) Prior Publication Data

US 2005/0147383 A1 Jul. 7, 2005

(51) Int. Cl.
*H04N 5/91* (2006.01)
*H04N 5/00* (2006.01)
*H04J 3/06* (2006.01)

(52) U.S. Cl. .................. 386/124; 386/69; 386/125; 370/503

(58) Field of Classification Search ............. 386/69, 386/70, 65, 95, 125; 370/503; 707/204
See application file for complete search history.

(56) References Cited

U.S. PATENT DOCUMENTS

| | | | |
|---|---|---|---|
| 5,867,176 A | 2/1999 | Yamagishi | |
| 5,949,953 A | 9/1999 | Shirakawa et al. | |
| 6,539,164 B2 | 3/2003 | Shirakawa et al. | |
| 6,904,229 B1* | 6/2005 | Suzuki et al. ................ | 386/95 |
| 7,212,728 B2 | 5/2007 | Shirakawa et al. | |
| 2002/0091722 A1* | 7/2002 | Gupta et al. ................ | 707/204 |
| 2002/0097750 A1* | 7/2002 | Gunaseelan et al. ........ | 370/503 |
| 2002/0131761 A1* | 9/2002 | Kawasaki et al. ........... | 386/65 |
| 2005/0141863 A1* | 6/2005 | De Haan .................... | 386/69 |

FOREIGN PATENT DOCUMENTS

| | | |
|---|---|---|
| JP | 8-140043 | 5/1996 |
| JP | 9-37209 | 2/1997 |
| JP | 10-162561 | 6/1998 |
| JP | 2000-50208 | 2/2000 |
| JP | 2001-86430 | 3/2001 |

OTHER PUBLICATIONS

Japanese Patent Office Notice of Reasons for Rejection, mailed Jun. 26, 2007 and issued in corresponding Japanese Patent Application No. 2002-255686.

* cited by examiner

*Primary Examiner*—Thai Q. Tran
*Assistant Examiner*—Syed Y. Hasan
(74) *Attorney, Agent, or Firm*—Staas & Halsey LLP

(57) ABSTRACT

The invention is directed to the provision of a moving image data playback method, and more particularly, an MPEG data playback method that can randomly access MPEG data stored at a VBR. The playback method comprises: storing in a table an average bit rate computed from time information at the beginning and end of stored moving image data; detecting and storing the time information and position information of randomly accessible picture groups one at the beginning of the moving image data and the other at the end thereof, and computing a picture group unit time from the number of frames between adjacent picture groups and storing the result in the table; computing a point to be accessed, based on the average bit rate and other information stored in the table; and starting playback from the computed point to be accessed, and storing in the table the time information and position information of the picture groups detected during the playback and the average bit rate between each picture group computed from the detected time information and position information.

5 Claims, 12 Drawing Sheets

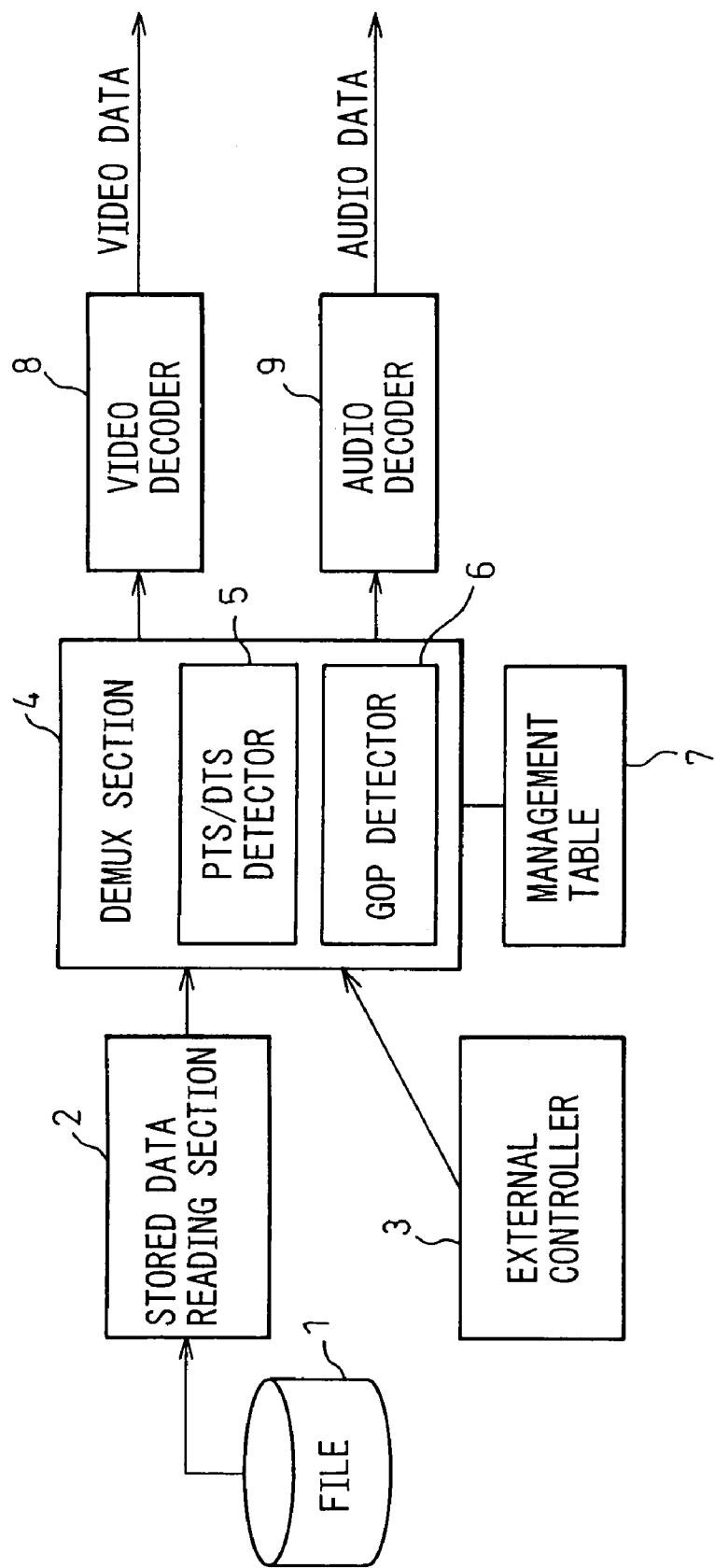

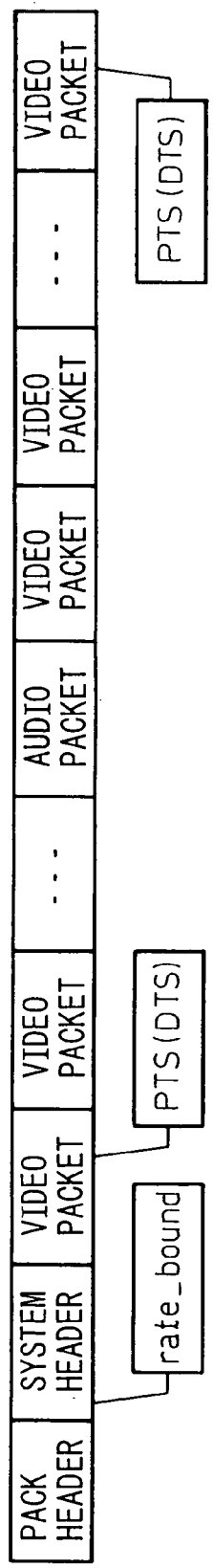
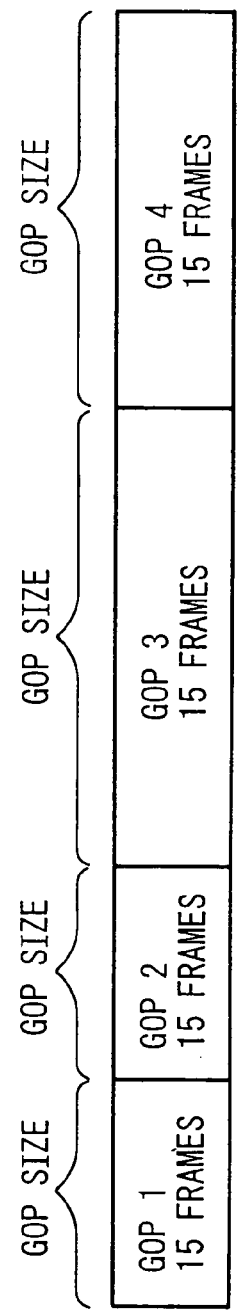
FIG.2A
FIG.2B

FIG.10

| MAXIMUM BIT RATE | 6000000 BPS |
|---|---|
| ONE-GOP DURATION TIME | 0.5 SECOND |

| GOP TIME | BYTE POSITION | AVERAGE BIT RATE | |
|---|---|---|---|
| 0 SECOND | 100 BYTES | 4000000 BPS | (STARTING GOP) |
| 200 SECONDS | 100000100 BYTES | | (ENDING GOP) |

FIG.11

| MAXIMUM BIT RATE | 6,000,000 BPS |
|---|---|
| ONE-GOP DURATION TIME | 0.5 SECOND |

| GOP TIME | BYTE POSITION | AVERAGE BIT RATE | |
|---|---|---|---|
| 0 SECOND | 100 BYTES | 6,000,000 BPS | (STARTING GOP) |
| 0.5 SECOND | 375,100 BYTES | 6,000,000 BPS | (SECOND GOP) |
| 1 SECOND | 750,100 BYTES | 3,989,949 BPS | (THIRD GOP) |
| 200 SECONDS | 100,000,100 BYTES | | (ENDING GOP) |

FIG.12

| GOP TIME | BYTE POSITION | AVERAGE BIT RATE | |
|---|---|---|---|
| 0 SECOND | 100 BYTES | 6,000,000 BPS | (STARTING GOP) ← 20 SECONDS SPECIFIED |
| 10 SECONDS | 7,500,100 BYTES | 2,666,666 BPS | |
| 100 SECONDS | 37,500,100 BYTES | 5,000,000 BPS | |
| 200 SECONDS | 100,000,100 BYTES | | (ENDING GOP) ← 80 SECONDS SPECIFIED |

FIG.13

| GOP TIME | BYTE POSITION | AVERAGE BIT RATE | |
|---|---|---|---|
| 0 SECOND | 100 BYTES | 6,000,000 BPS | (STARTING GOP) |
| 10 SECONDS | 7,500,100 BYTES | 2,666,666 BPS | |
| 10.5 SECONDS | 7,666,766 BYTES | 2,666,666 BPS | |
| 11 SECONDS | 7,833,432 BYTES | 3,901,234 BPS | |
| 200 SECONDS | 100,000,100 BYTES | | (ENDING GOP) ← 11.5 SECONDS SPECIFIED |

METHOD AND APPARATUS FOR PLAYING-BACK MOVING IMAGE DATA

BACKGROUND OF THE INVENTION

1. Field of the Invention

The present invention relates to a method and apparatus for playing-back MPEG (Moving Picture Experts Group) data, and more particularly to an MPEG data playback method and apparatus that can randomly access MPEG data stored at a variable bit rate (VBR) and can perform normal playback, reverse playback, fast forward playback, or fast reverse playback from any desired point.

2. Description of the Related Art

With the decreasing prices of MPEG encoders, and with increasing speeds of LANs enabling transmission of large-capacity data, MPEG compression schemes are widely used today. In MPEG1 and MPEG2, which provide methods for compressing moving images for storage, the compression is done on the assumption that the data will be played back in the forward direction along the time axis.

There are two methods of compression: constant bit rate (CBR) compression, in which moving images are compressed at a fixed bit rate, and variable bit rate (VBR) compression, in which, in order to maintain near constant image quality, scenes where compression efficiency is low are compressed at higher bit rates and conversely, scenes where compression efficiency is high are compressed at lower bit rates.

In the MPEG schemes, a unit called a GOP (Group of Pictures) is defined as a point that makes random access possible. A GOP begins with an I frame which can be decoded without referring to a previous or future frame, and the I frame is followed by a sequence of P and B frames which refer to previous and/or future frames. Therefore, an image can be played-back in the forward direction from a GOP point; when playing-back an MPEG moving image from an arbitrary point, the image is played back from a GOP point in the neighborhood of that arbitrary point.

In the case of an MPEG file stored at a CBR, any desired GOP point can be found by simple calculation, because the GOP size is determined by the constant bit rate and the number of frames constituting one GOP. On the other hand, in the case of an MPEG file stored at a VBR, it is not easy to find the desired GOP point because the GOP size varies from one GOP to another.

Therefore, in the case of arbitrary stored data to which index information indicating the location of each GOP point is not appended, such as VBR compressed MPEG data downloaded via a network, the entire data is scanned to identify the location of each GOP point, and the GOP points are stored in the form of an index file or like information. Then, by seeking the desired GOP point by using the thus created information, special playback other than playback in the forward direction from the beginning of the data is performed.

As described above, when performing special playback of arbitrary MPEG stored data and, in particular, VBR compressed MPEG stored data, as an index file or the like has to be created prior to the playback, there has been the problem that it takes much time to start the playback in the case of stored data with a high average bit rate or a large amount of stored data.

SUMMARY OF THE INVENTION

In view of the above problem, it is an object of the present invention to provide an MPEG data playback method, and an apparatus, adapted to constantly improve the search accuracy of random access points during playback of arbitrary MPEG stored data; for this purpose, when playing back arbitrary MPEG stored data, an average bit rate is calculated and, for a portion not yet played-back, the access point to be searched for is predicted, while, for a portion already played back, the GOP point value detected at the time of the playback of that portion is used and the predicted data for special playback is dynamically updated using the GOP point value. This achieves quick and accurate searching for a random access point, regardless of the file structure such as CBR or VBR or the presence or absence of an index file.

According to the present invention, there is provided a moving image data playback method comprising: storing in a table an average bit rate computed from time information at the beginning and end of stored moving image data; detecting and storing the time information and position information of randomly accessible picture groups one at the beginning of the moving image data and the other at the end thereof, and then computing a picture group unit time from the number of frames between adjacent picture groups and storing the result in the table; computing a point to be accessed, based on the average bit rate stored in the table and on the time information and position information of the picture groups and the picture group unit time stored in the table; and starting playback from the computed point to be accessed, and successively storing in the table the time information and position information of the picture groups detected during the playback and the average bit rate between each picture group computed from the detected time information and position information.

According to the present invention, there is also provided a moving image data playback apparatus for playing-back stored moving image data, comprising: means for computing an average bit rate, for searching, by extracting time information at the beginning and end of the moving image data; means for starting playback from an access point computed using the average bit rate for searching; means for successively storing prescribed playback information relating to the moving image data and detected during the playback; and means for correcting the average bit rate, for searching, by using the playback information stored for an already played back portion.

BRIEF DESCRIPTION OF THE DRAWINGS

The present invention will be more clearly understood from the description as set forth with reference to the accompanying drawings.

FIG. 1 is a diagram showing one configuration example of an MPEG data playback apparatus according to the present invention.

FIG. 2A is a diagram showing one example of MPEG data format (1).

FIG. 2B is a diagram showing one example of MPEG data format (2).

FIG. 10 is a diagram showing one example of the management table created when starting playback.

FIG. 11 is a diagram showing one example of updating the management table during playback in the forward direction.

FIG. 12 is a diagram (part 1) showing one example of finding seek byte position from the management table.

FIG. 13 is a diagram (part 2) showing one example of finding seek byte position from the management table.

DESCRIPTION OF THE PREFERRED EMBODIMENTS

Figure 3:
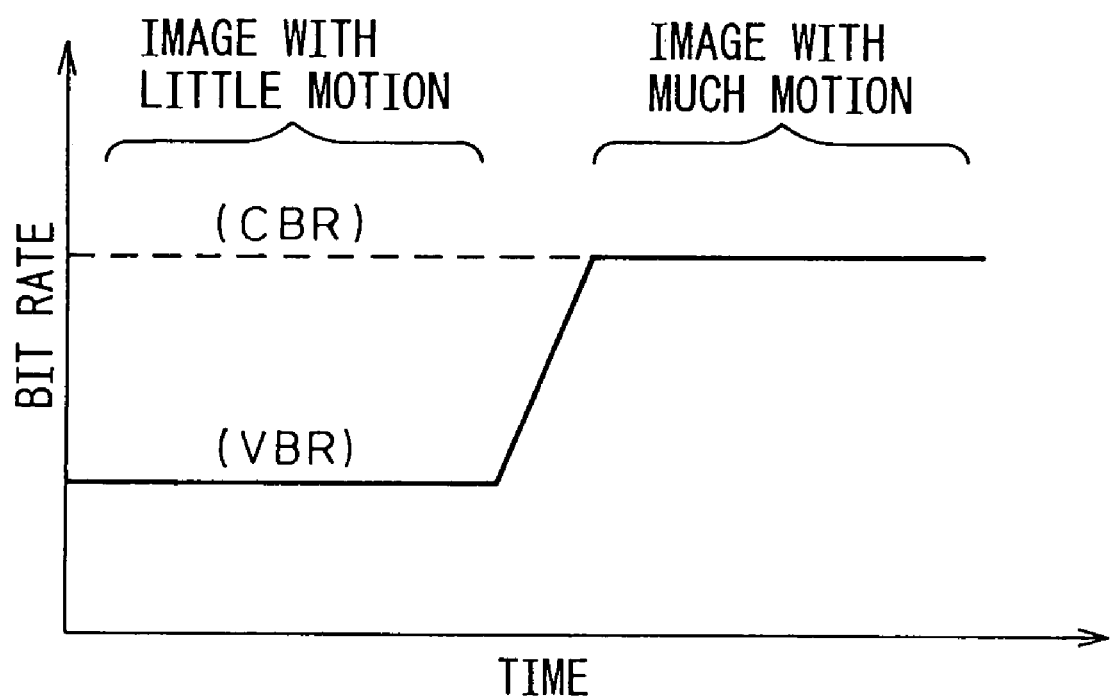
FIG. 3 is a diagram showing the relationship between video data and bit rate in VBR.

FIG. 1 is a diagram showing one configuration example of an MPEG data playback apparatus according to the present invention.

In FIG. 1, a file 1 is constructed on an auxiliary storage device such as a hard disk, and stores MPEG data such as MPEG1 or MPEG2-PS downloaded via a network. An external controller 3 issues an instruction, specifying, for example, an image to be played back and playback mode such as special playback, to a DEMUX section 4. Under control of the DEMUX section 4, a stored data reading section 2 reads out all or part of the MPEG data stored in the file 1 and transfers the readout data to the DEMUX section 4.

The DEMUX section 4, under instruction from the external controller 3, retrieves via the stored data reading section 2 the MPEG data to be played back in normal or special playback mode, and demultiplexes the MPEG data into MPEG video data and MPEG audio data. The demultiplexed MPEG video data and MPEG audio data are supplied to a video decoder 8 and an audio decoder 9, respectively.

The video decoder 8 applies decoding such as the inverse DCT transform to the received MPEG video data, and outputs the decoded video data. The audio decoder 9 also applies similar decoding to the MPEG audio data, and outputs the decoded audio data.

The above configuration is the same as a conventional MPEG data playback apparatus, but the present invention differs from the conventional apparatus by the inclusion of the following configuration. That is, a PTS/DTS detector 5 and a GOP detector 6 are provided within the DEMUX section 4, and a management table 7 is attached to the DEMUX section 4. Before explaining the PTS/DTS detector 5, GOP detector 6, and management table 7, an outline of the MPEG data that is relevant to them will be given below.

FIGS. 2A and 2B shows one example of the MPEG data format. FIG. 3 shows the relationship between video data and bit rate in VBR.

FIG. 2A shows one example of the MPEG1-SYSTEM or MPEG2-PS (Program Stream) data format, which begins with a pack header and ends with an end code (not shown). The pack generally comprises a plurality of packets, and the pack header at the beginning of the pack carries an MPEG1-SYSTEM identification code "00" or MPEG2-PS identification code "01".

In a system header, parameters for the entire stream are described, and its rate_bound field defines the bit rate; the other fields carry various parameters describing the number of video channels, the number of audio channels, etc. The packet header of each video packet or audio packet carries parameters such as PTS (Presentation Time Stamp), an information unit for managing the time of playback output, and DTS (Decoding Time Stamp), an information unit for managing the time of decoding; each information unit is constructed from a 33-bit cyclic counter and can manage a time of up to about 26 hours, at maximum.

FIG. 2B shows one example of VBR video stream size. As earlier described, the GOP (Group of Pictures) has a structure that includes at least one intracoded frame (I frame) in order to make random access possible. One GOP comprises a sequence header and a GOP field, and the GOP field contains at least one I frame and a plurality of B and P frames; the duration of each group is usually about 0.5 second (15 frames).

In the case of a VBR, as the GOP size varies according to the amount of motion in the image, the bit rate is varied as shown by a solid line in FIG. 3 to maintain the frame transfer rate (30 frames/second). On the other hand, in the case of CBR, the bit rate is fixed to the preset maximum as shown by a dashed line in FIG. 3, and dummy data (padding data) is inserted in low bit rate data in order to maintain the GOP size constant.

Turning back to FIG. 1, the PTS/DTS detector 5 detects the PTS (DTS) information contained in the packet header of each video packet. The GOP detector 6 detects each GOP which provides a random access point. The management table 7 is a data table to which additions, changes, and updates are made as needed at the time of normal playback as well as special playback, based on the information detected by the PTS/DTS detector 5 and the GOP detector 6.

An embodiment of the present invention will be described below by focusing on the control flows of FIGS. 4 to 9 while also referring to the management table examples shown in FIGS. 10 to 14.

(1) Starting Playback of Stored Data

Figure 4:
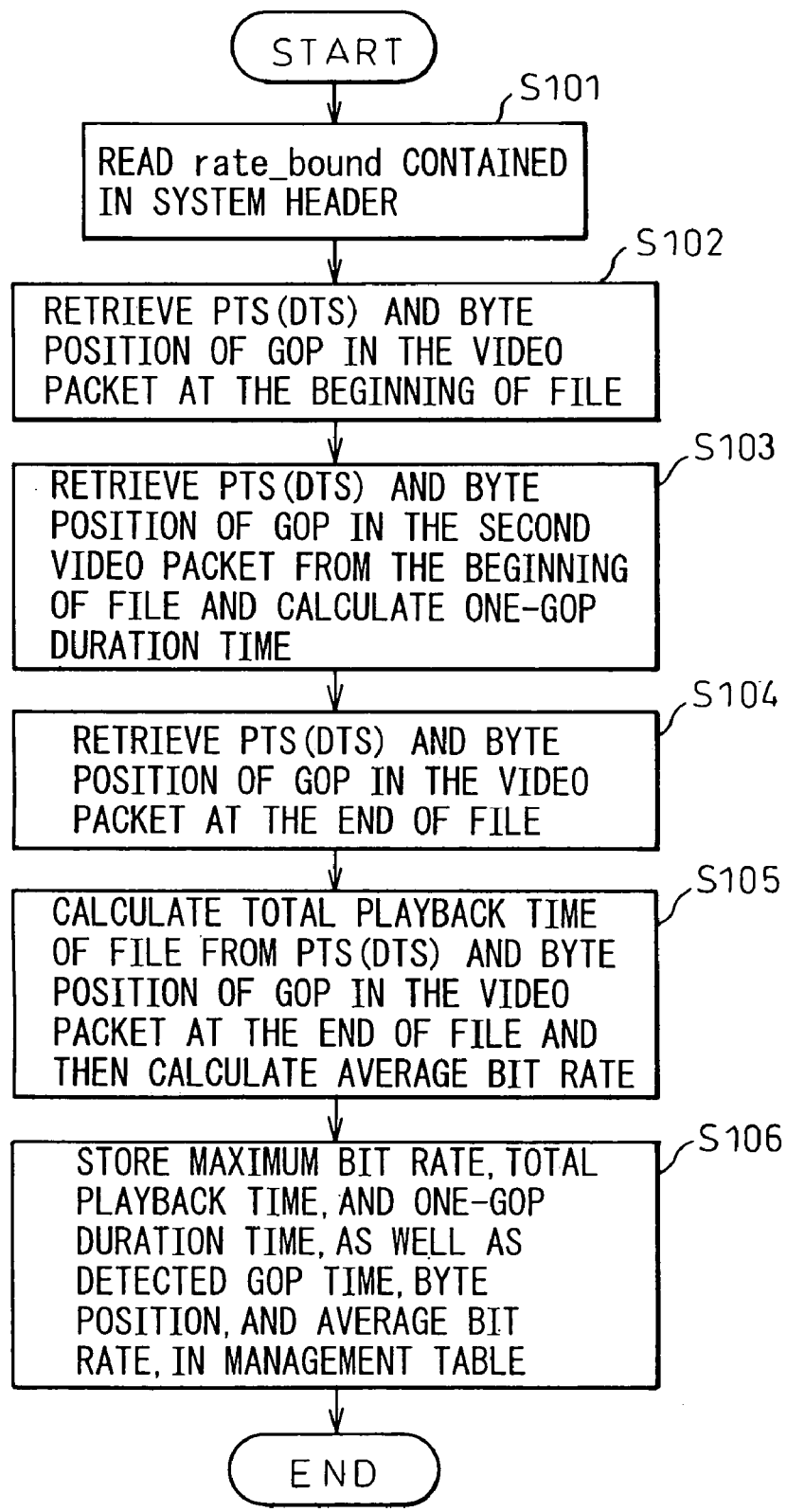
FIG. 4 is a diagram showing one example of a control flow when starting playback of stored data.

FIG. 4 shows one example of the control flow when starting playback of the stored data. FIG. 10 shows one example of a playback management table which is created first prior to the start of playback of the stored data.

When an instruction to playback a specified MPEG file is received from the external controller 3, the DEMUX 4 first controls the stored data reading section 2 to read the beginning portion of the specified MPEG file from the file 1, and thus retrieves the contents of the rate_bound field in the system header, based on which the maximum bit rate of the store data is computed (S101). The computed maximum bit rate (in the illustrated example, 6 Mbps) is stored in the special playback management table as the data that defines the maximum rate for playback (FIG. 10).

Next, the PTS or DTS of the GOP in the video packet at the beginning of the file is retrieved, and its byte position is also retrieved (S102). Further, the PTS or DTS of the GOP in the second video packet from the beginning of the file is retrieved, and its byte position is also retrieved. Then, one-GOP duration time is calculated from the number of frames between the two GOPs, and the calculated value (in the illustrated example, 0.5 second) is also stored in the special playback management table (S103).

Generally, in MPEG stored data, whether it is CBR or VBR, the number of frames within one GOP is the same, though the amount of data varies from GOP to GOP;

therefore, in many cases, the GOP time unit remains the same for each GOP. As a result, the one-GOP duration time information is effective information for special playback. The above-described maximum bit rate and the one-GOP duration time are stored as fixed values and will not be changed or updated after that.

Finally, scanning is started from the position the maximum bit rate×α (the time with which the final GOP can be retrieved) back from the end of the file, and the PTS or DTS of the GOP in the final video packet and its byte position are retrieved (S104). From this information and the earlier obtained first GOP information, the total playback time of the file is calculated as shown below (S105).

Here, let the maximum bit rate be denoted by Max_Bit_Rate, the first PTS (DTS) by First_PTS, the first byte position by First_Byte, the last PTS (DTS) by Last_PTS, the last byte position by Last_Byte, and the total playback time by Total_Time. Since PTS (DTS) is a 33-bit cyclic counter with units of 90 KHz, the total playback time can be described by the following equation. The following equation can also calculate the time exceeding the maximum 26 hours that can be specified by 33 bits.

```
if (First_PTS <= Last_PTS) {
    Total_time = (Last_PTS - First_PTS)/90000
} else {
    Total_time = (Last_PTS + 0x200000000 - First_PTS)/90000
}
while (Max_Bit_Rate < (Last_Byte - First_Byte) * 8/Total_Time) {
    Total_Time += 0x200000000/90000
}
```

In the example of FIG. 10, the average bit rate (in the illustrated example, 4 Mbps) is computed from the byte size (total byte count) of the file by using the total playback time computed by the above equation. The GOP time of each of the first and last GOPS, their byte positions, and the average bit rate between the first and last GOPs are thus determined. By acquiring the minimum information required for file playback prior to the start of the playback as described above, the initial management table 7 for special playback of the MPEG file is created (S106).

In the present invention, as the average bit rate of the data is calculated only from the MPEG stored data, and as only the starting and ending portions of the stored file need be searched, the amount of search at the start of playback is reduced and, therefore, the playback is started more quickly than in a conventional system that requires the creation of an index file.

(2) Playing Back in Forward Direction From the Top

Figure 5:
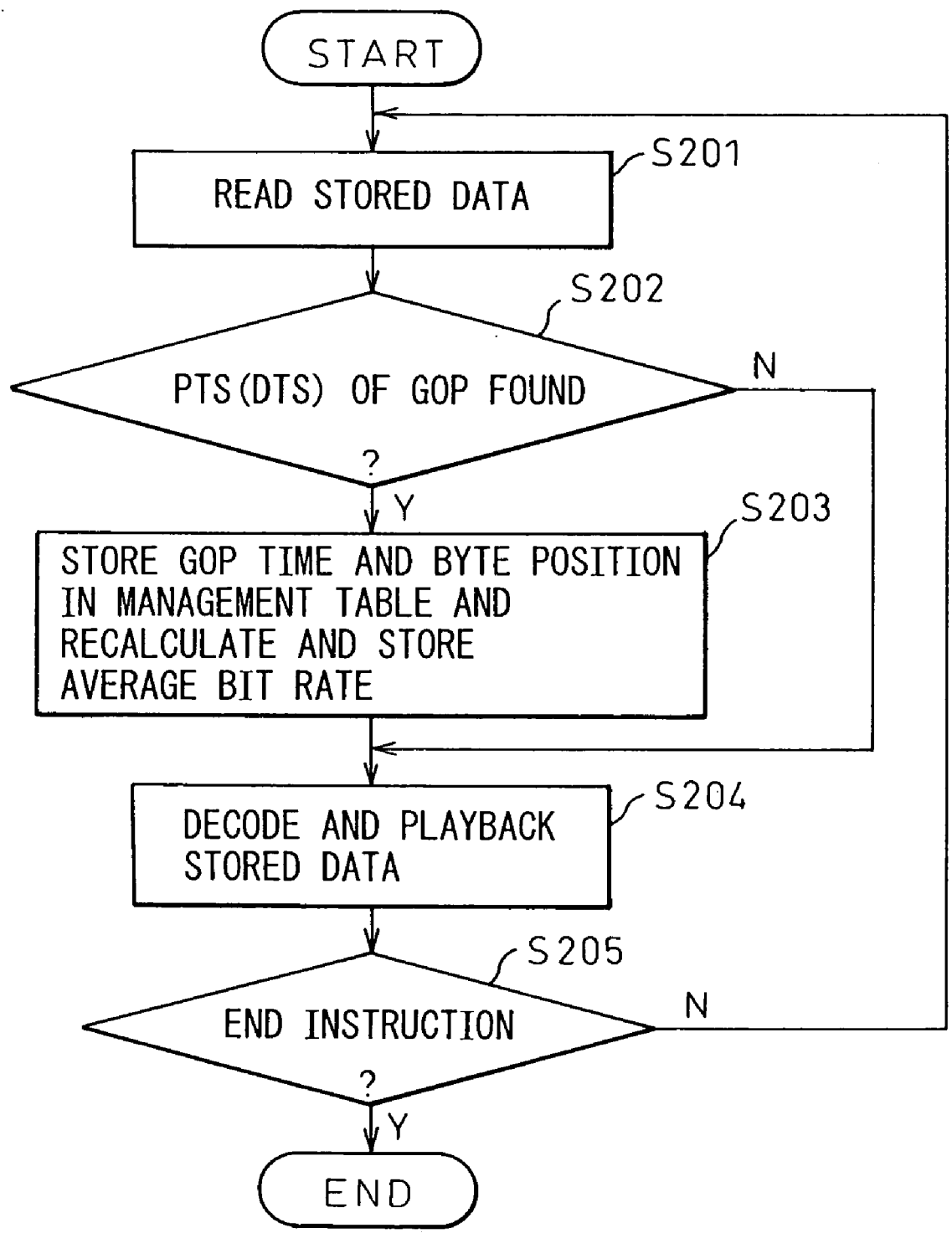
FIG. 5 is a diagram showing one example of a control flow when playing back in the forward direction.

FIG. 5 shows one example of the control flow when playing back in the forward direction. FIG. 11 shows one example of updating the management table 7 during playback in the forward direction.

When an instruction to play back in the forward direction is received from the external controller 3, the DEMUX 4 controls the stored data reading section 2 to read a sequence of stored data sequentially for decoding and playback (S201). During the decoding/playback process (S204), the bit rate of each GOP is computed from the actually detected time of each GOP and the byte position of the stored data of each GOP, and the stored contents of the management table are successively updated by the resulting information (S202 and 203).

In the example of FIG. 11, the time of each of the second, third, and subsequent GOPs, the byte position of each GOP, and the average bit rate of each GOP, computed based on the information detected by the GOP detector 6 during the forward playback process, are inserted and stored between the starting GOP and the ending GOP.

Figure 6:
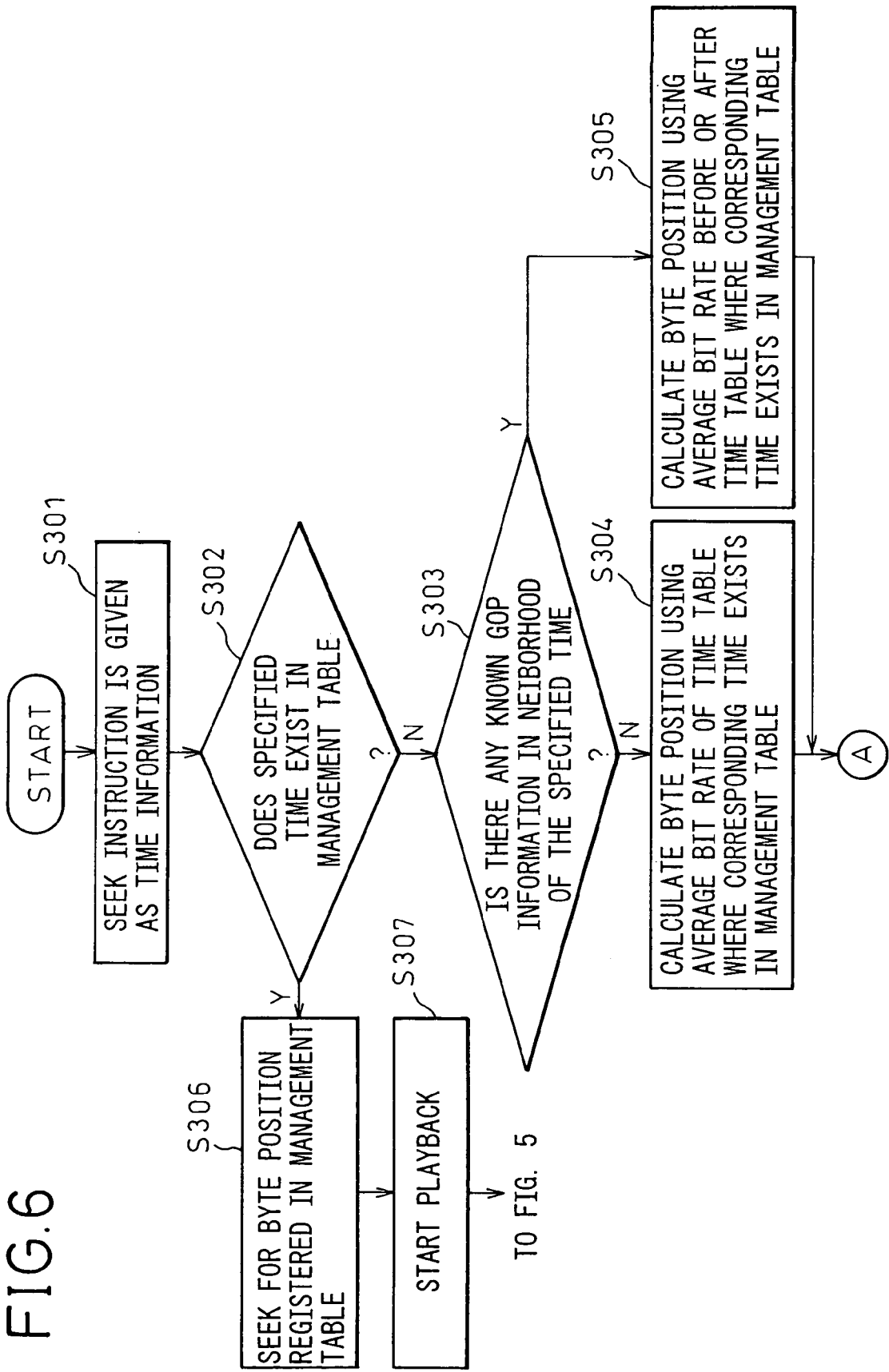
FIG. 6 is a diagram showing one example of a control flow (part 1) initiated upon reception of a seek instruction.
Figure 7:
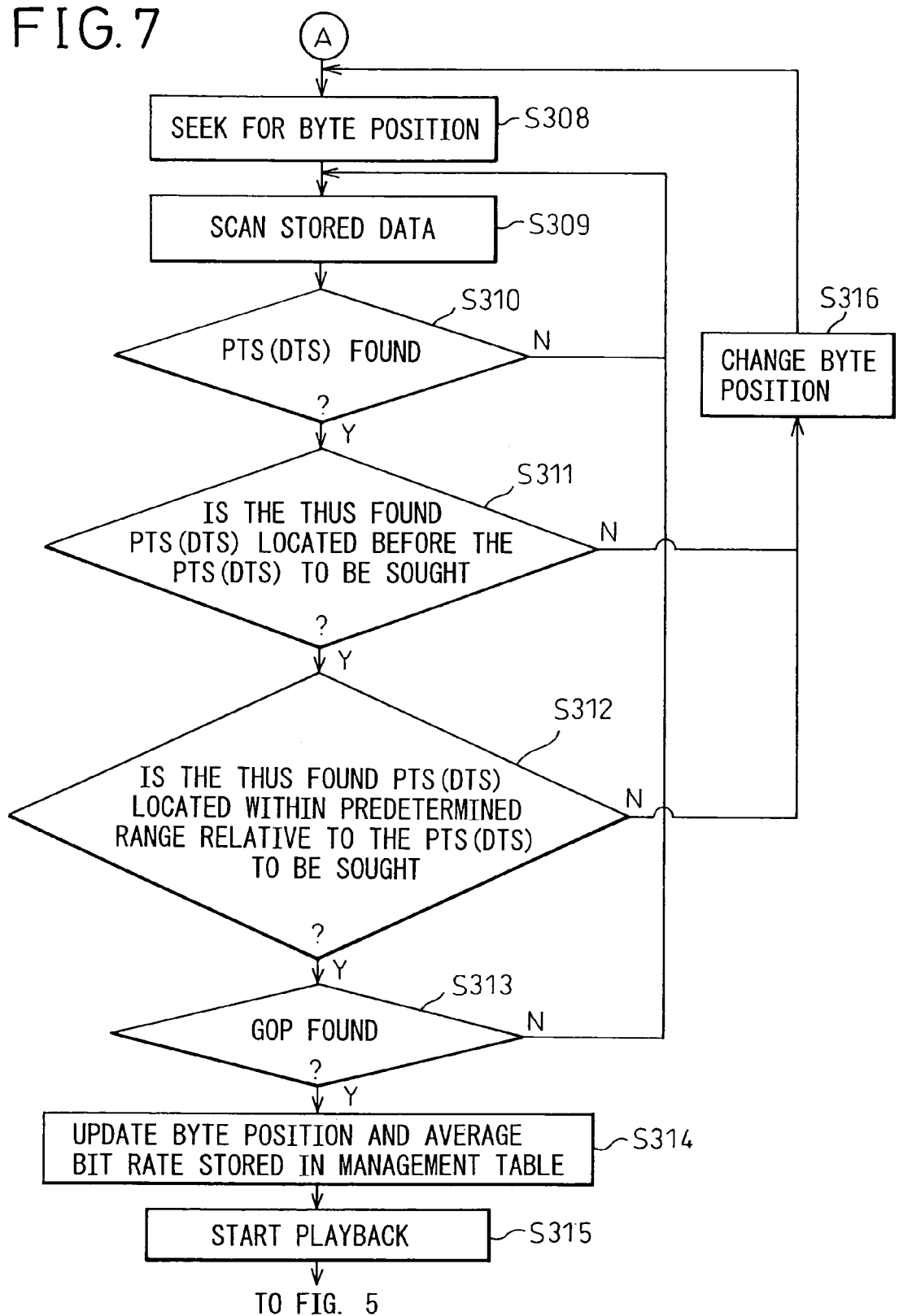
FIG. 7 is a diagram showing one example of the control flow (part 2) initiated upon reception of the seek instruction.

(3) Seek Instruction Occurs at Time for Which GOP Byte Position is Not Registered in Management Table FIGS. 6 and 7 show one example of the control flow initiated upon reception of a seek instruction. FIGS. 12 and 13 show one example of finding seek byte position from the management table 7.

In FIG. 6, as the seek instruction from the external controller 3 is usually given in the form of time information with 0 indicating the playback start picture at the beginning of the file (S301), the DEMUX 4 calculates the PTS (DTS) to be sought as shown below by using the management table 7.

PTS(DTS)=(First_PTS+Specified time(seconds)/ 90000) & 0x1FFFFFFFF

If it is found, as a result of the above calculation, that the byte position information corresponding to the time to be sought already exists in the management table 7, the playback is started by directly accessing that byte position (S302, S306, and S307). The control flow after starting the playback is the same as that shown in FIG. 5.

On the other hand, if it is found as a result of the above calculation that the byte position information corresponding to the time to be sought does not exist in the management table 7, then it is determined whether any currently known GOP time and its byte position exist before or after or near the calculated time (S303). If they do not exist, the number of bytes is calculated by multiplying the "average bit rate" of the corresponding space by the "difference between the specified time and the known GOP time", and the byte position of the GOP is computed, to determine the byte position to be accessed (S304).

In the example of FIG. 12, the byte position to be accessed is calculated as shown below by using the average bit rate (2,666,666 bps) of the corresponding space, and also using the currently known nearest GOP time (10 seconds) and its byte position (7,500,100 bytes), if the calculated seek time is 20 seconds.

7500100+(2666666*(20−10)/8)

On the other hand, if the calculated seek time is 80 seconds, the byte position to be accessed is calculated as shown below by using the currently known nearest GOP time (100 seconds) and its byte position (37,500,100 bytes),

37500100−(2666666*(100−80)/8)

If any currently known GOP time and its byte position exist before or after or near the calculated time, the following point is further considered (S303 and S305). That is, in VBR, an image undergoing a scene change or containing much motion is encoded as high bit rate data, and an image with little motion is encoded as low bit rate data, as shown in FIG. 3.

Accordingly, when the GOP byte position corresponding to the seek position, excluding those before and after a motion change point, is not registered in the management table, but the average bit rate of a microscopic GOP unit immediately before or after the change point is registered in the management table, the seek accuracy improves when the average bit rate of the GOP unit immediately before or after the change point is used, rather than when the average bit rate for searching is used.

In this case, the GOP corresponding to the seek position is found by using the average bit rate immediately before or after the change point rather than using the average bit rate used in step 304, and the management table 7 is updated accordingly. In the example of FIG. 13, using the average bit rate (2,666,666 bps) of the GOP unit immediately before the corresponding change point, the byte position to be accessed is calculated as shown below for the case where the calculated seek time is 11.5 seconds.

7,833,432+(2666666*10/8)

As the nearer average bit rate is more accurate than the overall average bit rate, an accurate random access point can be computed using the nearer average bit rate; this serves to reduce the amount of stored data searched, and special playback can be started quickly.

Such a seek is effective for special playback that needs searching on a GOP-by-GOP basis, such as reverse playback (since MPEG can decode only in forward direction, one GOP is decoded starting from the point one GOP back and the pictures are presented in reverse order for display), fast playback (all the frames need not be decoded for fast forward but, for example, only I frames are decoded for each GOP and presented for display), and fast reverse playback (as in fast forward, only I frames are decoded for each GOP and presented for display). In this case, GOP-by-GOP time acquired at the time of playback start is used.

Thereafter, the stored data is searched in the forward direction, starting from the accessed byte position (S308 and 309). When the PTS (DTS) of a video packet is found, if the thus found PTS (DTS) is before and within a predetermined range relative to the PTS (DTS) to be sought, the stored data continues to be searched in the forward direction to search for a GOP (S310 to 313). Otherwise, the byte position to be accessed is recalculated from the average bit rate and the time difference between the thus found PTS (DTS) and the PTS (DTS) to be sought (S316).

When a GOP is found, the bit rates before and after that are computed from the time of the GOP and the byte position of the stored data of the GOP, and the management table 7 is updated by the resulting information, after which the playback is started (S313 to 315). In this way, the searching for the byte position corresponding to the seek, and the updating of the management table 7, are performed successively.

As is apparent from the above-described processes (1) to (3), in the present invention the average bit rate first obtained in the process (1) is successively updated in the processes (2) and (3). Accordingly, as the playback progresses, more accurate random access points can be computed and, at the same time, the amount of stored data searched can be reduced, thus making it possible to quickly start special playback of any arbitrary MPEG stored data.

(4) Consolidation of Management Table

Figure 8:
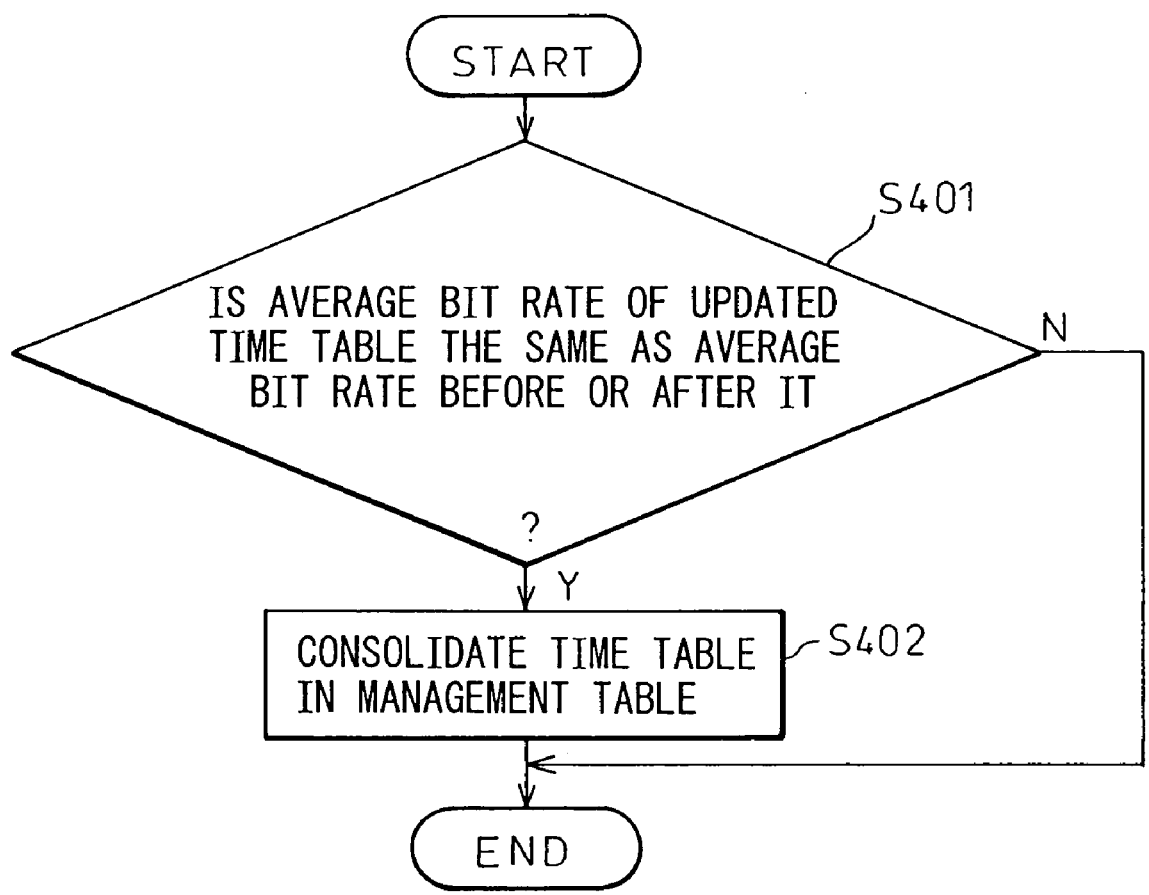
FIG. 8 is a diagram showing one example of a control flow for consolidating a management table.
Figure 14:
FIG. 14 shows one example of consolidation of the management table.

FIG. 8 shows one example of the control flow for consolidating the management table 7. FIG. 14 shows one example of the consolidated management table 7.

When the data for each detected GOP is successively stored in the management table 7, the table size will become enormous in the case of a large stored file. In view of this, in FIG. 8, if the bit rates of contiguous GOPs are the same, these GOPs are consolidated into a single GOP in order to reduce the size of the management table 7 (S401 and 402). Here, even if the bit rates are not exactly the same, it is possible to consolidate the GOPs if their bit rates are close to each other.

In the example of FIG. 14, the GOP time of 10 seconds and the GOP time of 10.5 seconds, both having the same average bit rate (2,666,666 bps), are consolidated by deleting the data for the GOP time of 10.5 seconds. The data for the GOP time of 10.5 seconds deleted here can be accurately computed using the previously given equation.

(5) Searching for GOP Unit

Figure 9:
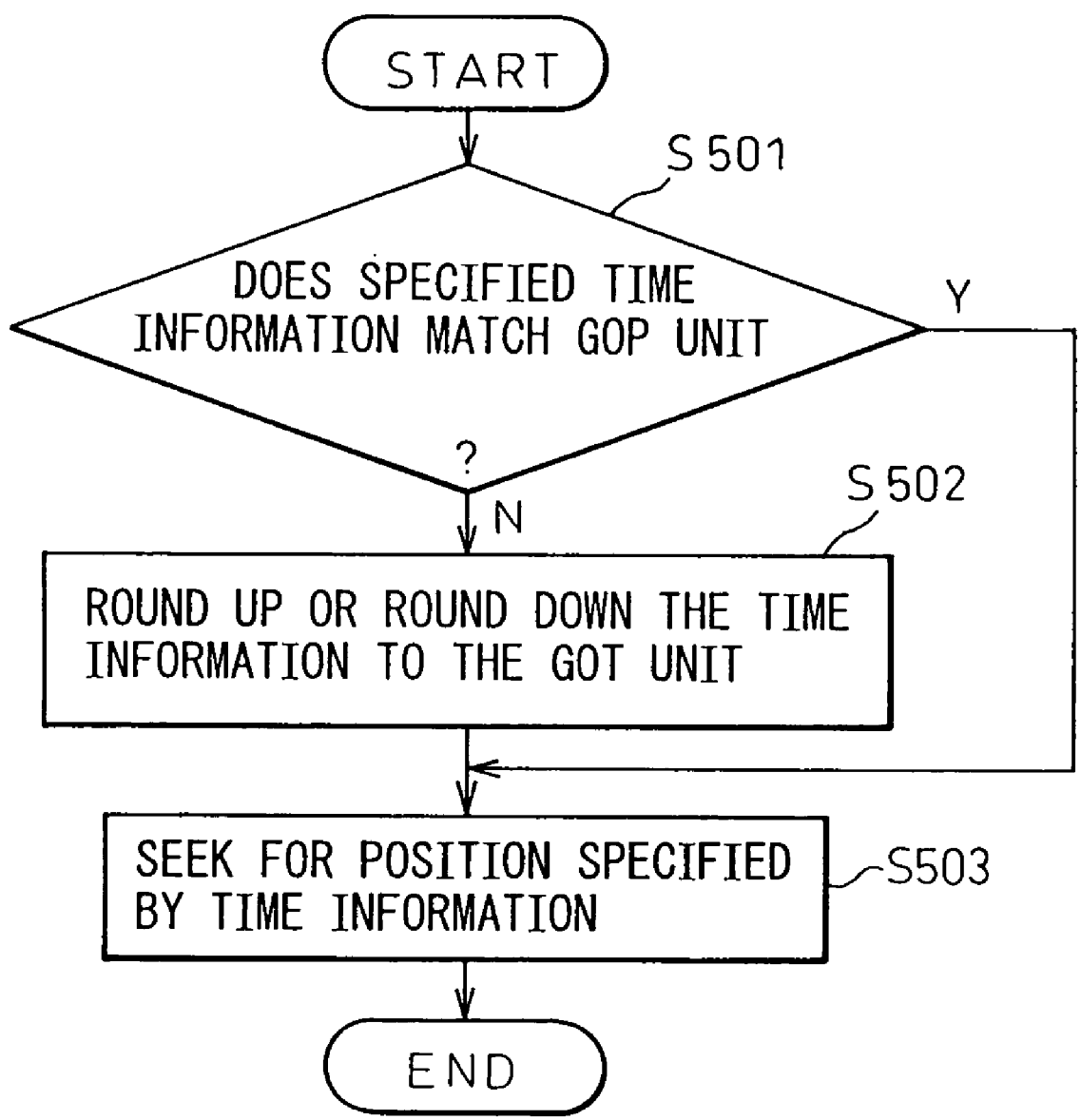
FIG. 9 is a diagram showing one example of a control flow for converting the time specified by the seek instruction into time that matches the GOP unit.

FIG. 9 shows one example of the control flow for converting the time specified by the seek instruction into time that matches the GOP unit.

In FIG. 9, if the time specified by the seek instruction in the previously described process (3) does not match the GOP unit time, the GOP unit time closest to the specified time is obtained (S501 and S502). By searching for the byte position of the GOP unit in this way, the amount of stored data to be scanned from the byte position can be reduced.

As described above, according to the present invention, for any arbitrary MPEG stored data, the GOP point used to perform special playback can be found quickly and accurately by eliminating the need for external information such as index information or an index file, while reducing the amount of search to be conducted through the stored data.

More specifically, as the average bit rate of the data is calculated only from the MPEG stored data, and as only the starting and ending portions of the stored file are searched, the amount of search at the time of starting the playback can be reduced and the playback can be started more quickly than in a system that requires the creation of an index file.

Furthermore, since the average bit rate obtained before starting the playback is successively updated during the playback process, a more accurate random access point can be computed as the playback progresses; this serves to reduce the amount of stored data searched, and special playback can be started quickly.

Moreover, as the nearer average bit rate is more accurate than the overall average bit rate, an accurate random access point can be computed using the nearer average bit rate; this also serves to reduce the amount of stored data searched, and special playback can be started quickly.

The present invention is applicable not only to the case of a VBR stored file but also to the case of a CBR stored file. In the case of CBR, operations to the management table become redundant as the average bit rate on the management table is the same for each GOP; otherwise, the invention can be applied without having to take note of the structure of the stored file, whether it be CBR or VBR.

The invention claimed is:

1. A moving image data playback method comprising:
storing in a table an average bit rate computed from time information at the beginning and end of stored moving image data;
detecting and storing the time information and position information of randomly accessible picture groups one at the beginning of the moving image data and the other at the end thereof, and then computing a picture group unit time from the number of frames between adjacent picture groups and storing the result in the table;
computing a point to be accessed, based on the average bit rate stored in the table and on the time information and position information of the picture groups and the picture group unit time stored in the table; and
starting playback from the computed point to be accessed, and successively storing in the table the time information and position information of the picture groups detected during the playback and the average bit rate between each picture group computed from the detected time information and position information.

2. A moving image data playback method as claimed in claim 1, wherein the average bit rate of a yet-to-be-played-back portion to be accessed is corrected based on the stored time information, byte position, and average bit rate of a picture group in an already played back portion.

3. A moving image data playback method as claimed in claim 2, wherein when the yet-to-be-played-back portion is in the neighborhood of the already played back portion, the average bit rate of the already played back portion is used.

4. A moving image data playback method as claimed in claim 1, further comprising deleting redundant information that can be computed from the time information, position information, and average bit rate of any one of the picture groups stored in the table.

5. A moving image data playback apparatus for playing back stored moving image data, comprising:
- means for computing an average bit rate for searching by extracting time information at the beginning and end of the moving image data;
- means for starting playback from an access point computed using the average bit rate for searching;
- means for successively storing prescribed playback information relating to the moving image data and detected during the playback; and
- means for correcting the average bit rate for searching by using the playback information stored for an already played back portion.

* * * * *